United States Patent [19]
Takahashi et al.

[11] Patent Number: 5,444,354
[45] Date of Patent: Aug. 22, 1995

[54] CHARGING GENERATOR CONTROL FOR VEHICLES

[75] Inventors: Naoyuki Takahashi, Katsuta; Yuuji Maeda; Shouju Masumoto, both of Hitachioota; Atsushi Kanke, Hitachi, all of Japan

[73] Assignees: Hitachi, Ltd.; Hitachi Automotive Engineering Co., Ltd., Japan

[21] Appl. No.: 25,394

[22] Filed: Mar. 2, 1993

[30] Foreign Application Priority Data

Mar. 2, 1992 [JP] Japan .................. 4-044378

[51] Int. Cl.$^6$ ............................ H02P 9/10; H02J 7/22
[52] U.S. Cl. ................................ 322/28; 320/39
[58] Field of Search ............... 323/204; 322/59, 61, 322/28; 320/39, 40, 21, 20

[56] References Cited

U.S. PATENT DOCUMENTS

| | | | |
|---|---|---|---|
| 3,912,108 | 10/1975 | Clayton et al. | 320/39 |
| 4,590,414 | 5/1986 | Mayumi et al. | 320/64 |
| 5,105,143 | 4/1992 | Marumoto et al. | 322/28 |
| 5,157,321 | 10/1992 | Kato et al. | 322/28 |
| 5,194,801 | 3/1993 | Rozman | 322/28 |
| 5,319,299 | 7/1994 | Maehara | 322/28 |

FOREIGN PATENT DOCUMENTS

0416871A2 3/1991 European Pat. Off. .
0421332A2 4/1992 European Pat. Off. .
60-27280 6/1985 Japan .
3-60338 5/1991 Japan .

OTHER PUBLICATIONS

Official Communication from German Patent Office with translation.

Primary Examiner—Steven L. Stephan
Assistant Examiner—Robert Nappi
Attorney, Agent, or Firm—Evenson, McKeown, Edwards & Lenahan

[57] ABSTRACT

Electric generator control for a motor vehicle in which the field current IF provided to the field coil of the generator is variable between two values in response to variations in the load applied to the battery. The output voltage of the battery is compared to a predetermined reference value, and a signal representing the difference is supplied to a voltage divider and to an integrator circuit. The outputs of the voltage divider and the integrator are then provided to respective, comparators. A reference signal provided by a time variable signal generator is supplied to both comparators, the respective outputs of which are connected to the inputs of an AND gate which controls a gating element which in turn controls the field current. In the case of a sudden increase in load applied to the battery, the output of the integrator responds more slowly than the voltage divider, which tracks the difference signal instantaneously, and the operation of the power switch is controlled by the output of the integrator circuit.

26 Claims, 10 Drawing Sheets

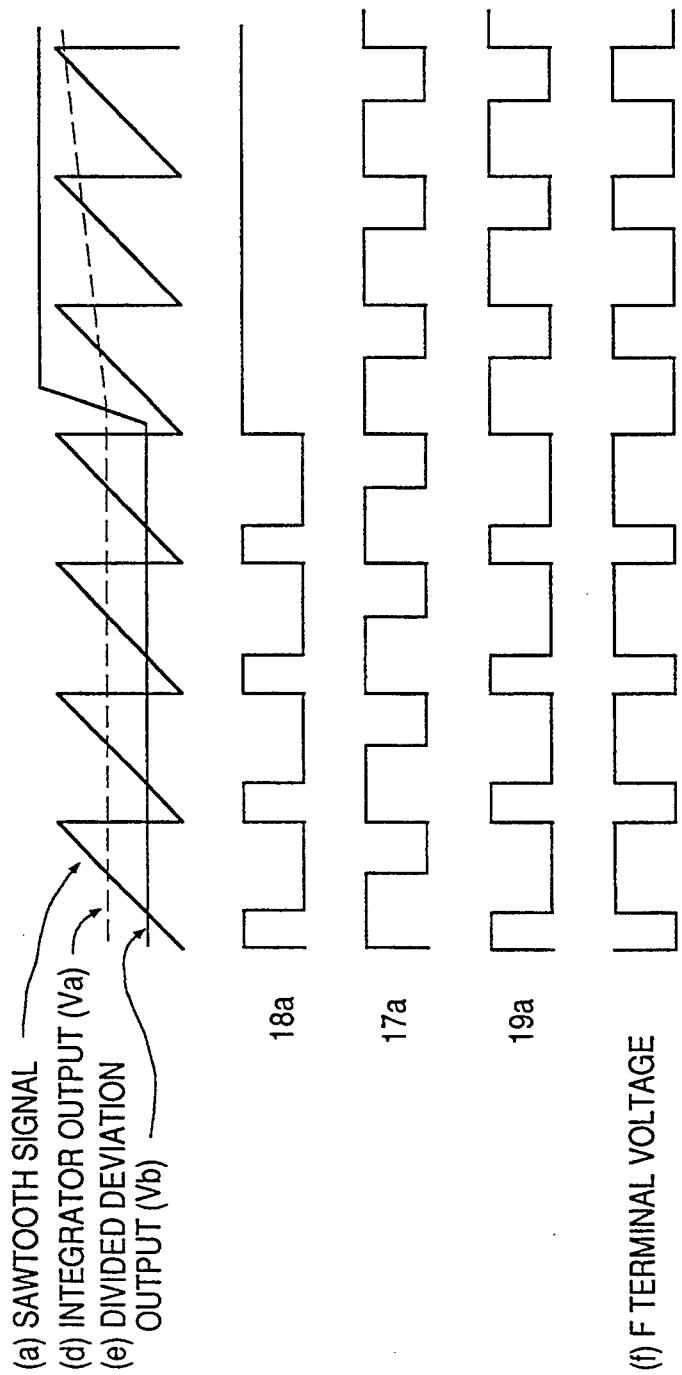

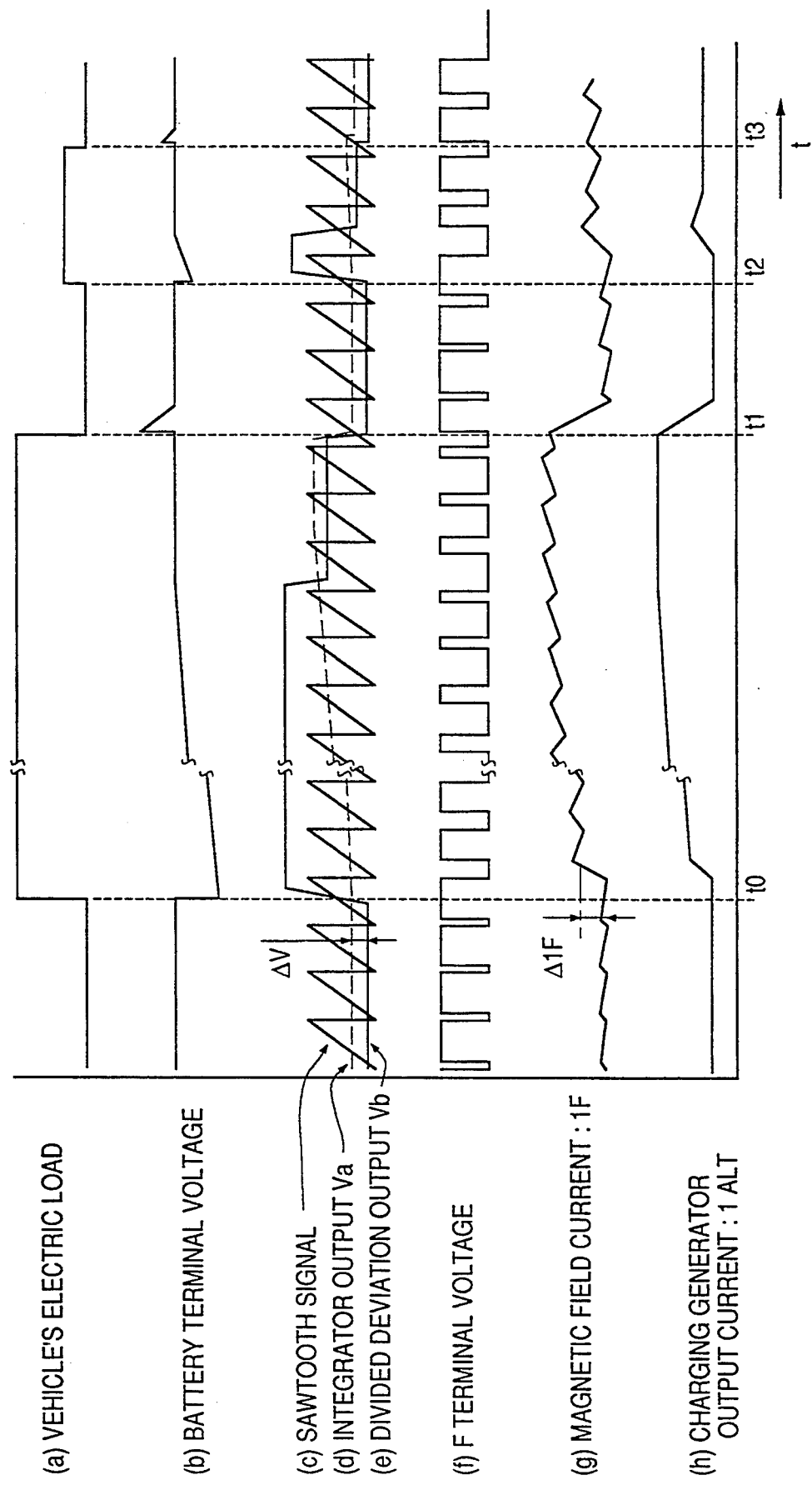

$\Delta V' = R151 \times I152$ $\Delta V'' = VF \simeq 0.7v$

CHARGING GENERATOR CONTROL FOR VEHICLES

BACKGROUND AND SUMMARY OF THE INVENTION

The present invention is related to a charging generator controller for vehicles, especially vehicles to be driven appropriately by an engine with large variation of load.

Every car has a battery and a battery charging generator to supply power to the electric loads such as lamps, actuators, and so on. In general, the generator is controlled so that the rotating magnetic field coil is excited by the rotating force of the drive torque generated by the engine, and the battery voltage generated in the field coil by the rotating magnetic field i maintained at a specified value.

However, when the electric load becomes large, due, for example to a lamp switch being turned on, the power output of the generator must also be increased. To meet this requirement, the generator is controlled so that the current flowing in the field .coil may increase sharply when the electric load becomes large. As a result, the power output of the generator increases, the driving torque becomes large and the balance between the driving torque and engine torque is lost. The engine speed therefore drops until the engine torque equals that required to drive the generator. In the worst case, the engine may stall. Especially in the idling state, a rapid torque change, which is greater than the response speed of the engine rotation control, will become a problem, because the engine speed is controlled at a fixed value, assuming that the balance between the engine and driving torques of auxiliary devices including the generator is maintained.

To suppress such phenomenon, a control method has been considered to reduce the rapid rise of the current flowing in the field coil, and thus minimize the sudden change of the generator torque for the engine when the electric load suddenly increases. This type of control, referred to as Load Responsive Control, is described in Japanese Patent laid open No. 60-27280. The control technology to suppress the sudden rise of the current flowing in a field coil when the continuity rate of the switch elements connected serially to the field coil increases more than the specified value is also given in Japanese Laid-Open Patent No. 60338/1991.

In the conventional technology described above, the control apparatus is configured so that the continuity rate of the switch elements is detected, and minor loop control is always actuated to delay the increasing flow of field current in the field coil. This operation is continued even in the steady state in which the engine speed and the output current are stable. However, although the rate of increase in the flow of magnetic field current is slower, the rate of decrease remains equal to that of the conventional circuit without minor loop control.

Similarly, the surge of the output voltage caused by the rapid rise of the field current also becomes slower, but the rate of decrease in voltage remains equal to that of the conventional circuit without minor loop control. The average value of output voltage with no minor loop control is almost equal to the center value of the output voltage surge. In contrast, with minor loop control the average output voltage goes below the center value of the output voltage surge. With the effects mentioned above, the voltage decrease characteristics in which the output voltage decreases as the output current increases becomes much larger than that of the conventional circuit without minor loop control, causing the charging/discharging balance of vehicles to be degraded.

An object of the present invention is to provide a charging generator control for vehicles, which allows the magnetic field current to respond immediately to the output voltage, and thus to control the output voltage precisely.

Another object of the present invention is to provide a charging generator control for vehicles, in which the integrating circuit used for load corresponding control in the steady state (that is, when the output current is stable, or when a small electric load is applied) does not affect the voltage control loop at all.

SUMMARY OF THE INVENTION

These and other objects and advantages are achieved according to the present invention, which provides means to compare the battery voltage or rectifier voltage with a predetermined reference value, means to control the magnetic field current to be supplied to the magnetic field coil according to the result of the comparison, and means to select a load capacity according to the circuit to be controlled by the current control method, using a larger response time constant when the magnetic field current exceeds the set value.

In one embodiment of the invention, the output of a deviation signal output circuit is stable when the battery voltage is stable. In this state, the input voltage to an integrating circuit is equal to the output voltage. A pair of comparators are provided, which use the output from the same saw tooth signal generator as a reference voltage. A first of the comparators is supplied with the output from the integrator circuit, while the second comparator receives the output signal from the deviation signal output circuit, which is first passed through a voltage divider. The outputs from these comparators are entered to the respective inputs of an AND circuit, which in turn is coupled to control a power switch. The outputs of the respective comparators are driven to provide an OFF signal when the voltage output from the integrating circuit (in the one case), or the divided deviation signal output (in the other case), is attained by the sawtooth input. Thus, the duty cycle of the output of the AND circuit is controlled by the lower of these two voltages.

In this arrangement, the magnetic field current is controlled in the steady state by the voltage $V_b$, obtained by dividing the deviation signal in the divider circuit. However, when a vehicle's electric load is applied at time t0 and the output of the battery decreases, the output of the deviation signal output circuit increases immediately, and the output of the integrating circuit increases at a rate determined by its time constant. On the other hand, since the voltage $V_b$ obtained by dividing the deviation signal in the divider increases instantaneously, the operation of the POWER switch is controlled by the output of the integrating circuit $V_a$ after the $\Delta V$ value (the difference between the output voltages of the integrating circuit and the voltage divider circuit) is exceeded. The magnetic field current then increases slowly.

Other objects, advantages and novel features of the present invention will become apparent from the following detailed description of the invention when con-

BRIEF DESCRIPTION OF THE DRAWINGS

FIGS. 3(a) and 3(b) are waveforms which illustrate characteristics of the electric load of the present invention, and each terminal voltage response;

DETAILED DESCRIPTION OF THE DRAWINGS

Figure 1:
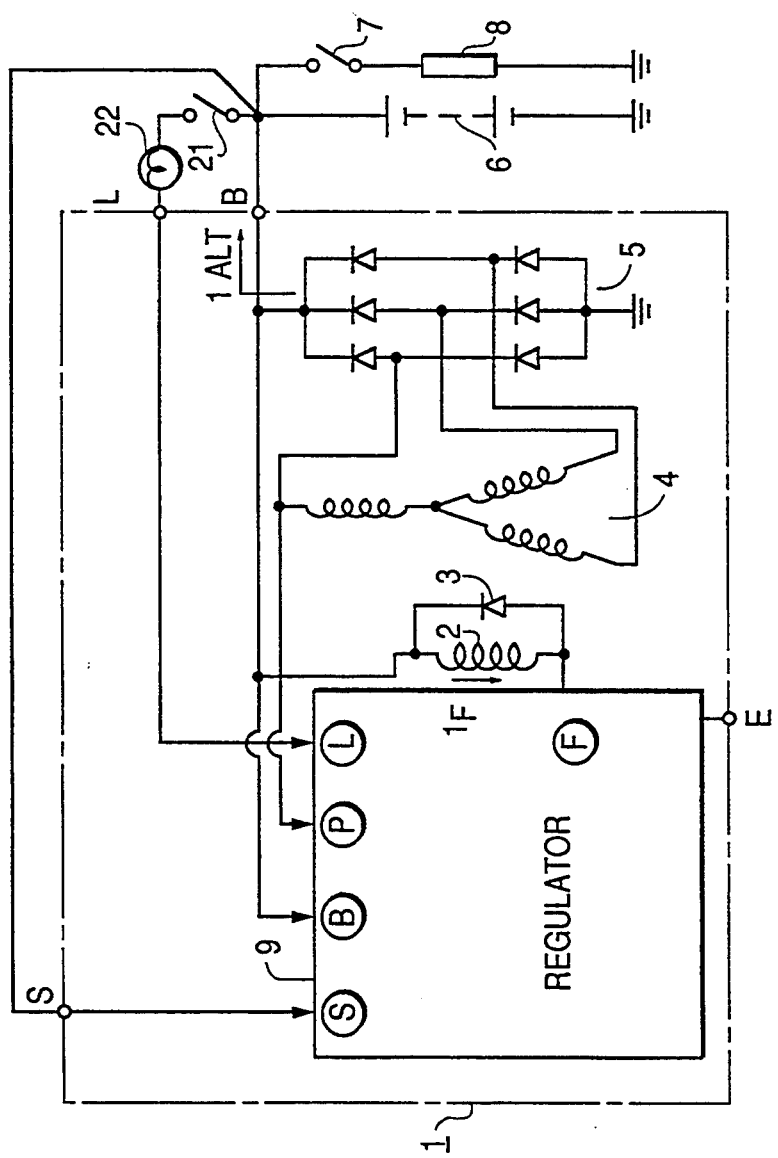
FIG. 1 depicts a system configuration of the charging generator controller for vehicles according to the present invention.

FIG. 1 shows the control circuit of the generator charging system for vehicles and FIG. 2 shows the details of the regulator 9 shown in FIG. 1. The field coil 2 of the charging generator 1 (FIG. 1) is mounted on a rotor (not shown), and rotates synchronously with the rotation of the engine to generate a rotating magnetic field. (The flywheel diode 3 connected in parallel to the field coil 2 is used to absorb switching noises.)

The armature coil 4, mounted on a fixed iron core (not shown) that faces the rotor, outputs a voltage with an AC waveform dependent on the strength of the rotating magnetic field created by the field coil 2. The AC output is fully rectified in the 3-phase full wave rectifier circuit 5, and is supplied to the battery 6 through the output terminal "B" of the charging generator 1, charging the battery 6, and to the electric load 8 for lamps, etc., through the load switch 7. The output voltage supplied by the battery 6 is connected via key switch 21 (FIG. 1) and the charge lamp 22, to the charge lamp drive circuit 23, which is controlled by the signals output from the rotation detector 24 (FIGS 2(a) and 2(b).

Figure 2A:
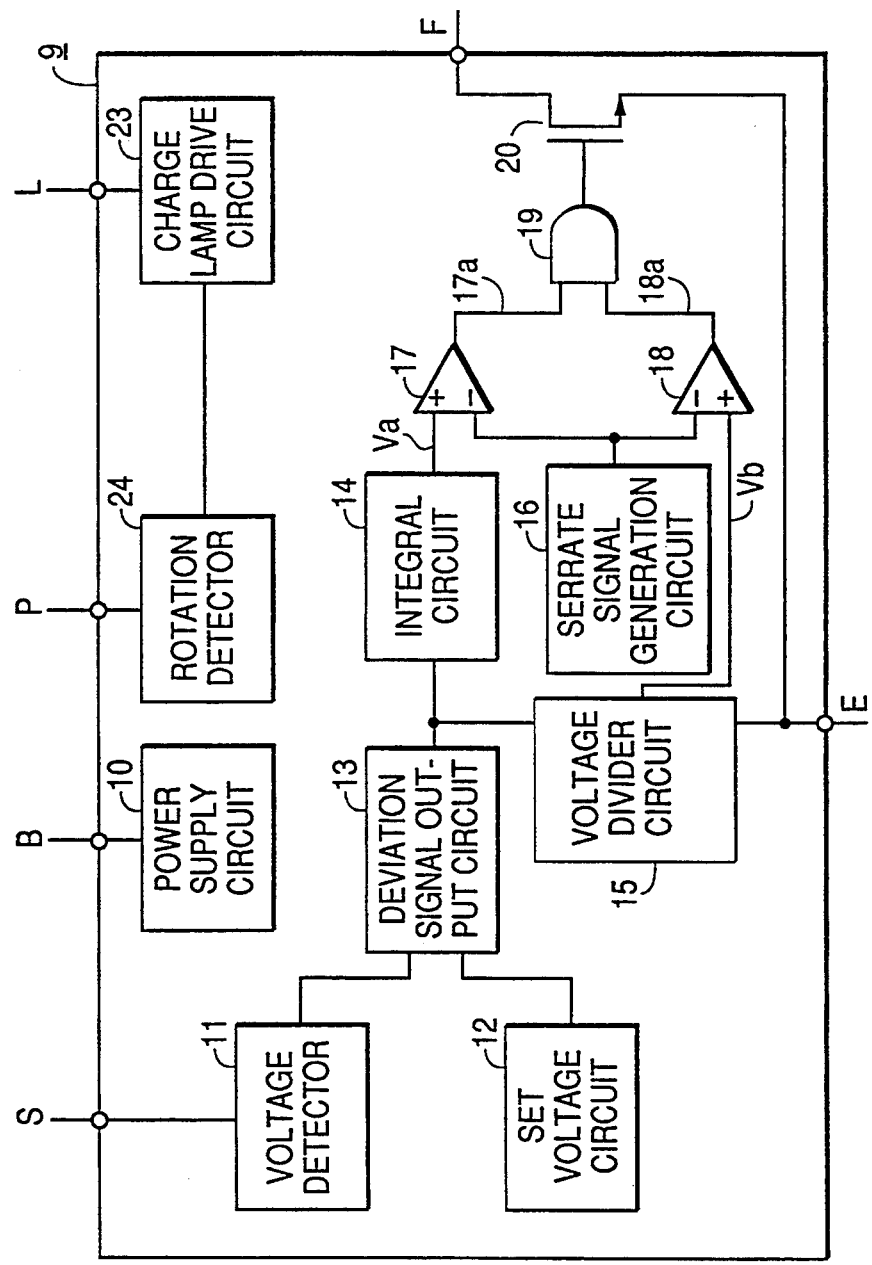
FIGS. 2(a) and 2(b) are block diagrams of alternative embodiments of the regulator circuit of the above-shown controller system.

The battery 6 is connected to the power supply circuit 10 of the regulator 9 (FIG. 2(a)). Receiving the output from the regulator 9, the battery 6 provides a fixed voltage, which is supplied to each circuit of the charging generator 1. The output from the battery 6 is also connected to the voltage detector 11 (FIG. 2(a)), whose output is entered to the deviation signal output circuit 13, where it is compared with the output from the set voltage circuit 12 provided to generate the reference voltage. The output from the deviation signal output circuit 13, equal to the difference between the reference voltage provided by the set voltage circuit 12 and the output of the voltage detector 11, is then provided to the integrating circuit 14, which has a large time constant as well as to the voltage divider circuit 15. The voltage $V_a$ output from the integrating circuit 14 and the voltage $V_b$ output from the deviation signal output circuit 13 in the voltage divider 15 are entered to the comparators 17 and 18, respectively, where they are compared with the output from the sawtooth signal generator 16. The outputs of the respective comparators are driven from an ON state to an OFF state when the sawtooth signal present at their negative inputs equals or exceeds the voltage present at their respective positive inputs. The outputs from the comparators 17 and 18 are then entered to the AND circuit 19, which is connected to the gate of power MOS-FET 20 that controls the magnetic field current to be supplied to the field coil via terminals E and F. (See FIG. 1.)

Figure 2B:
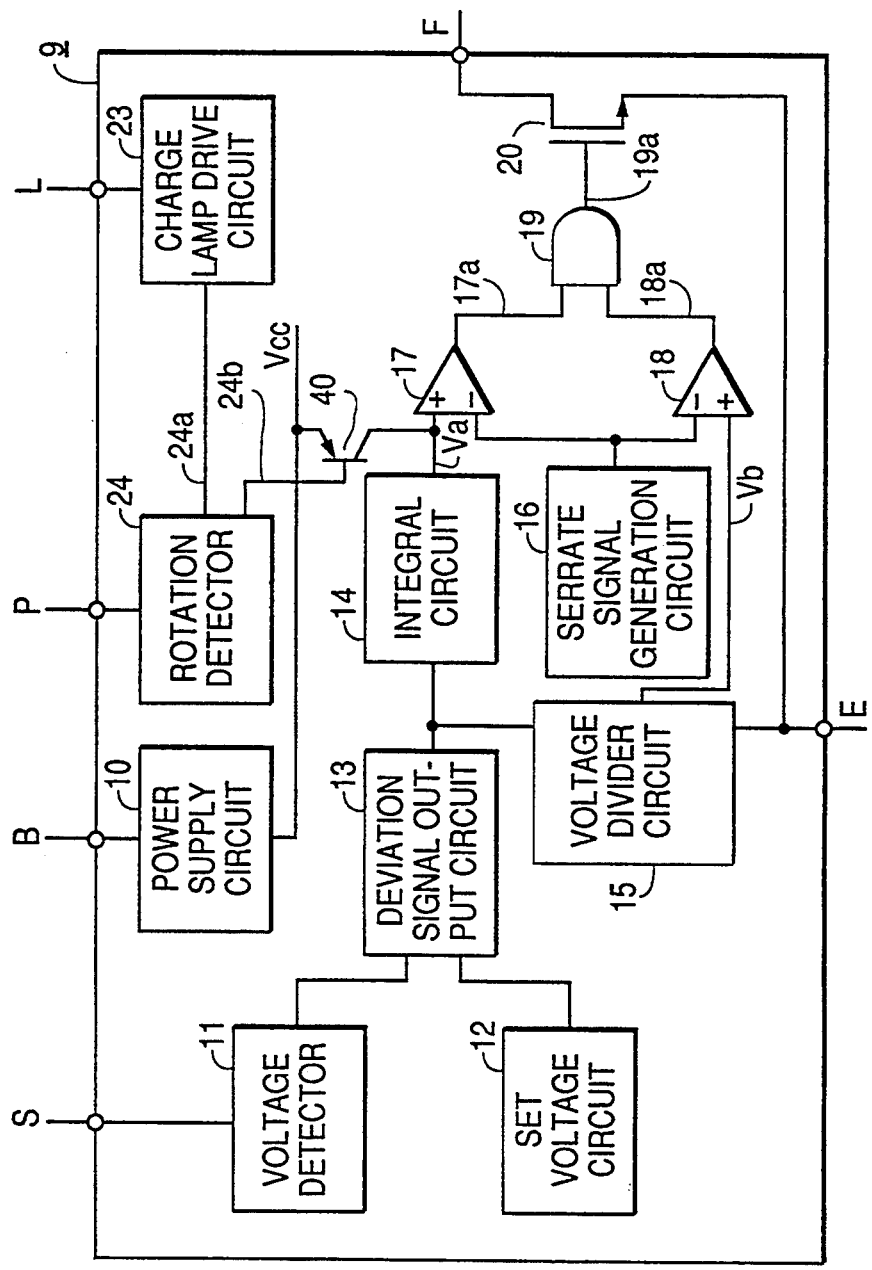
Figure 4:
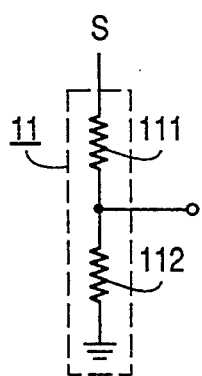
FIG. 4 shows the details of the voltage detector in FIG. 2.

FIG. 2(b) shows another embodiment of the regulator 9, which differs from that of FIG. 2(a) in that a PNP transistor 40 is connected between the power supply circuit 10 and the output of the integrating circuit 14, and is controlled in accordance with the output of the rotation detection circuit 24. When rotation speed of the engine exceeds a preset value, PNP transistor 40 is turned on, and thus maintains the output of the integrating circuit 14 at a value which is higher than the maximum output voltage of the sawtooth signal generator 16. Thus, in this embodiment, it is assured that when the engine speed exceeds the preset value, the output of comparator 17 cannot be driven from an ON to an OFF state, as mentioned above.

FIGS. 3(a) and 3(b) are depictions of the respective waveforms, which illustrate the operation of the regulator 9 in FIG. 2(a) when a load is applied to the system. Referring first to FIG. 3(a), the first line shows the sawtooth signal from sawtooth signal generator 16 superimposed on the integrator output $V_a$ and the voltage divider output $V_b$. The second and third lines show the outputs 18a, 17a of comparators 18 and 17, respectively, while the fourth line represents the output of AND gate 19, and the last line is the output voltage at terminal F. Comparing these waveforms, it can be seen that during steady state operation, the voltages $V_a$ and $V_b$ are constant, with $V_b$ being lower due to the operation of voltage divider circuit 15. Thus, as the sawtooth voltage signal rises, it first reaches the level $V_b$, at which point the output 18a of comparator 18 is driven to zero, or an OFF state. At this time also, the AND gate 19 is consequently disabled so that the voltage at terminal F increases, as shown on the last line. When the sawtooth signal cycles back to its starting voltage, which is lower than both $V_b$ and $V_a$, AND gate is once again enabled, and the voltage at terminal F goes to zero. Thus, is can be seen that the duty cycle of the voltage at terminal F is controlled by the voltage $V_b$.

FIG. 3(b) shows the waveforms from the first and last lines in FIG. 3(a), in the context of the overall operation of the invention. As can be seen by a comparison of the Figures, the third line of FIG. 3(b) corresponds to the first line of FIG. 3(a), showing the voltages $V_a$ and $V_b$, as well as the sawtooth signal. The fourth line of FIG. 3(b) shows the voltage at terminal F, and corresponds to the last line of FIG. 3(a).

In FIG. 3(b), the first line shows the application of a load to the vehicle's electric system at time $t_0$, which causes the battery voltage to spike downward as shown in the second line. When the battery voltage drops, the output from deviation signal output circuit 13 (not shown) immediately increases, as does the divided deviation voltage $V_b$ shown in the third line. As shown in FIG. 3(a), however, the integrator output $V_a$ rises more slowly, dependent on its time constant. Thus, upon application of such an electric load at time $t_O$, the divided deviation output $V_b$ becomes larger than the integrator output $V_a$, so that as the sawtooth signal rises, it first reaches the level $V_a$, which then controls the duty cycle of the voltage at terminal F, as well as the magnetic field current $I_f$, and hence the charging generator output current, as shown in the last two lines of FIG. 3(b). If the vehicle is operated in this mode for a sufficient length of time, of course, the voltage $V_a$ eventually increases until it is once again greater than $V_b$. (See line 3, immediately preceding time $t_1$.) At this point, voltage $V_b$, being lower, again controls the duty cycle of the system.

When the electrical load is removed from the system, at time $T_1$, the battery voltage spikes upward, thus returning both $V_a$ and $V_b$ to their steady state levels, so that $V_b$ is once again lower than $V_a$ and controls the duty cycle of the voltage at terminal F (and hence the field current charging generator output). Once again, the electrical load is applied at time $t_2$ and removed at $t_3$, with the same effects.

As can be seen from the foregoing, the duty cycle of the power MOS-FET 20 (FIG. 2(a)) is driven by the lower of the voltage $V_a$ from the integrating circuit 14 or the voltage $V_b$ from divider 15.

In the embodiment of FIG. 2(b), in order to further extend the life of the battery 6, the above load corresponding control is carried out only at low engine speed, having a small engine torque. As shown in FIG. 2(b), the base of PNP transistor 40 is connected to the output 24b of the rotation detection circuit 24, the emitter of PNP transistor 40 is connected to VCC and the collector of PNP transistor 40 is connected to the output of the integrating circuit 14, respectively. When the engine speed (and hence the rotation speed of the charging generator 1) exceeds the preset reference speed, the output 24b of the rotation detector 24 changes from low level of a high level, and PNP transistor 40 switches from non-conducting to conducting state. Thus, the output $V_a$ of the integrating circuit 14 is driven to voltage VCC, and the output 17a of the comparator 17 remains at the high level. In this embodiment, therefore, when the engine speed falls below the preset level, the duty cycle of the power MOS FET 20 for controlling the magnetic field current is controlled by the output 18a of the comparator 18, and, as a result, it never enters into the load corresponding control condition.

Figure 5:
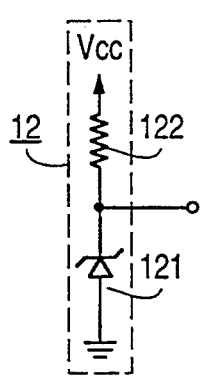
FIG. 5 shows the details of the set voltage circuit in FIG. 2.
Figure 6:
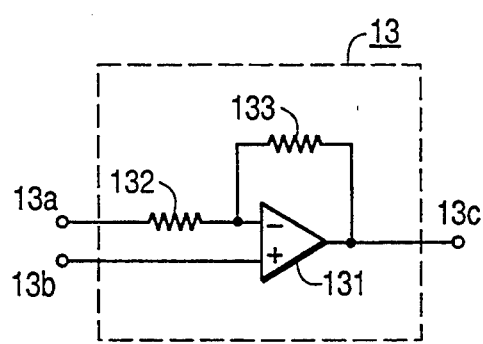
FIG. 6 the details of the deviation signal output circuit in FIG. 2.

FIGS. 4 through 8 show the details of some of the blocks shown in the schematic diagram of FIG. 2. The voltage detector 11 shown in FIGS. 2 and 4 obtains output signals from a point where the voltage detected at the S terminal is divided in resistors 111 and 112. The set voltage circuit 12, as shown in FIGS. 2 and 5, consists of a zener diode 121 and a resistor 122. It clamps the reference voltage Vcc using the zener voltage of the zener diode 121, and outputs the result as the set voltage. The deviation signal output circuit 13 in FIGS. 2 and 6 consists of an amplifier 131 and resistors 132 and 133. The circuit reverses and amplifies the difference between input signals 13a and 13b, then outputs the result, which is determined as follows:

$$V_{out} = V_{13b} - \left[ \frac{V_{13a} - V_{13b}}{R_{132}} \times R_{133} \right] \quad \text{Equation 1}$$

Figure 7:
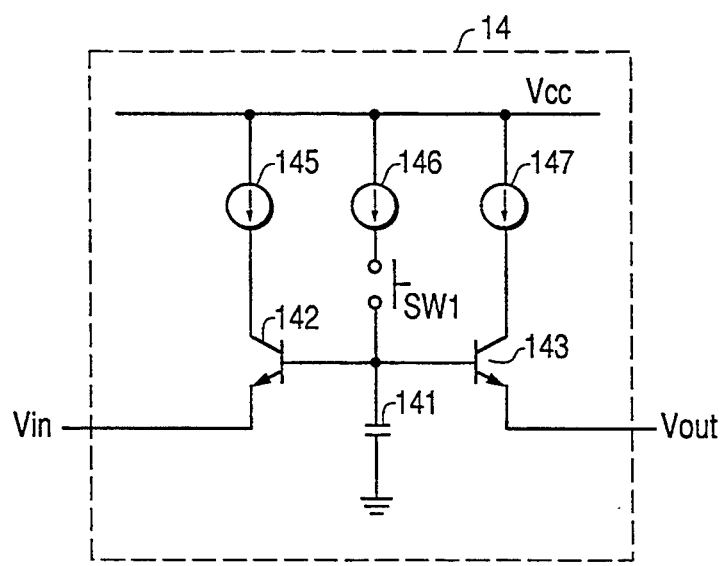
FIG. 7 shows the details of the integrating circuit in FIG. 2.
Figure 8:
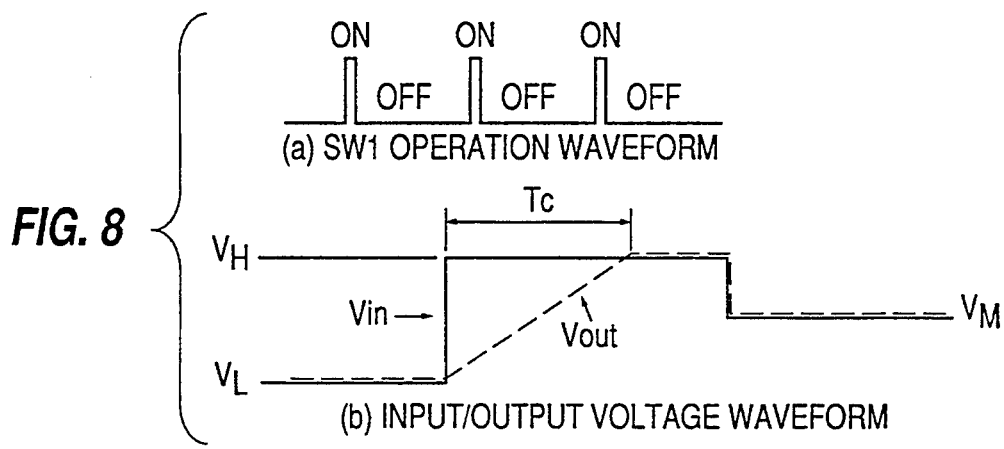
FIG. 8 shows the details of the operation waveform in FIG. 7.

In the integrating circuit 14, shown in FIGS. 2 and 7, the constant power supply 146 connects to the condenser 141 through the power switch SW1, while the base of the NPN transistors 142 and 143 connects to one end of the condenser 141. When the input voltage Vin changes from VL to VH as shown in FIG. 8, the switch SW1 is turned on to charge the condenser denser 141 with average current of $I_{cc}$. The charging voltage is saturated when the charging voltage of the condenser 141 reaches VH+VBE (base-emitter voltage of NPN transistor 142). When the input voltage Vin changes from VH to VL, the condenser 141 is discharged from the base of the NPN transistor 142 through the emitter. When the voltage of the condenser 141 reaches VL+VBE, the discharging ends. The output voltage (condenser 141 voltage-VBE) is obtained from VBE of the NPN transistor 143.

Assuming that VL=0 V, VH=5 V, and a condenser capacity=0.4 $\mu$F, when SW1 continuity rate=1/16, with a constant power supply=4 $\mu$A, the charging time TC can be found with the following expression.

$$TC = \frac{V \times C}{1} = \frac{(5V - 0V) \times 0.4\mu F}{4\mu A \times 1/16} = 8 \text{ sec} \quad \text{Equation 2}$$

As explained above, a time constant of 8 sec can be obtained by using a 0.4 $\mu$F condenser.

Figure 9:
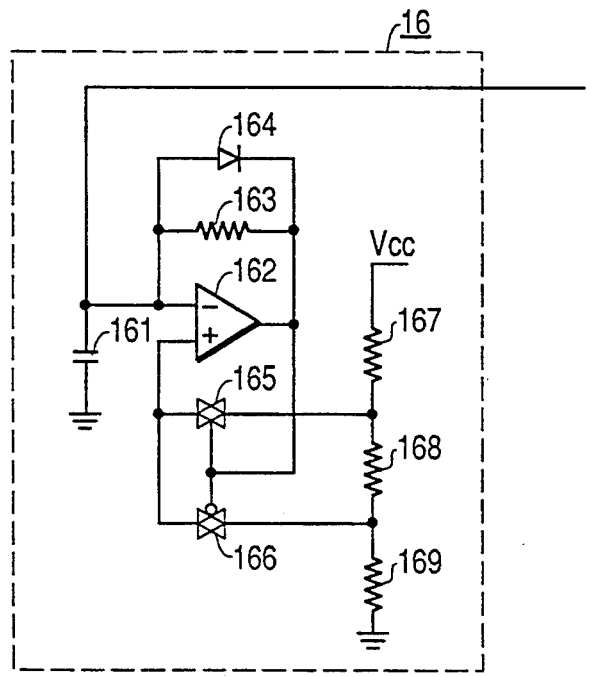
FIG. 9 shows the details of the sawtooth signal generator in FIG. 2.

In the sawtooth signal generator circuit in FIG. 9, when the output of the comparator 162 is on high level, the analog switch 165 is turned on to drive the minus input of the comparator to VH, and the condenser 161 is charged through the resistor 163 according to the time constant of CR until the charging voltage reaches VH. The output of the comparator 162 then changes to low level and the minus input of the comparator is set to VL through analog switch 166, so the condenser is discharged in an instant through the diode 164 until the condenser voltage goes down below VL.

Figure 10A:
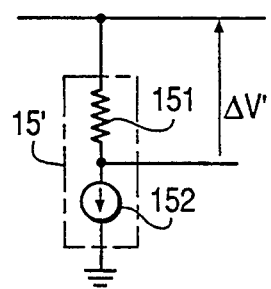
FIGS. 10(a) and 10(b) show alternative embodiments of the voltage divider circuit 15 in FIGS. 2(a) and 2(b)
Figure 10B:
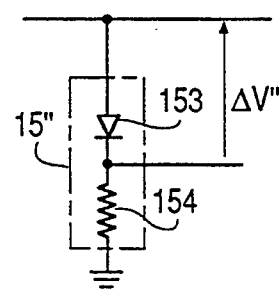

FIGS. 10(a) and 10(b) show alternative configurations for the voltage divider circuit 15 of FIGS. 2(a) and 2(b), in which the difference $\Delta V$ between the voltages $V_a$ and $V_b$ is fixed by different means. In FIG. 10(a), the current generator 152 causes a constant current to flow through resistor 151, thus establishing $\Delta V$ at $R_{151} \times I_{152}$. In FIG. 10(b), a diode 153 is substituted for the resistor 151, which fixes $\Delta V$ at the maximum forward biased (knee) voltage of the diode, which is 0.7 V.

If the vehicle's electric load is applied fully, the magnetic field current is increased slowly, and the output of the charging generator is increased at this time as well, then a large current flows out of the battery, shortening the battery life. Especially, repetitive loads of the turn signals, the hazard warning light, the electric windshield wipers, etc., are a problem in such a case. In the circuit according to the invention, however, the magnitude of the increase in magnetic field current $\Delta I_f$, which will trigger a change of the magnetic field current controlling voltage from $V_b$ (obtained by dividing the deviation signal in the divider 15), to $V_a$ (output from the integrating circuit 14), can be adjusted by changing the $\Delta V$ value according to the dividing ratio of the divider. Thus, the magnetic field current, and hence the output of the charging generator, can be adjusted immediately when the small capacity repetitive loads of the turn signals, the hazard warning light, the electric windshield wipers, etc., are applied, preventing the battery life from being degraded, as well as suppressing the variation of the generated voltage and flickering of the lamps. In the steady state in which the engine RPM value and the output current are stable, as well as when a small electric load is applied, a voltage control circuit that keeps good balance of charging/discharging of vehicles is thus achieved.

Figure 11:
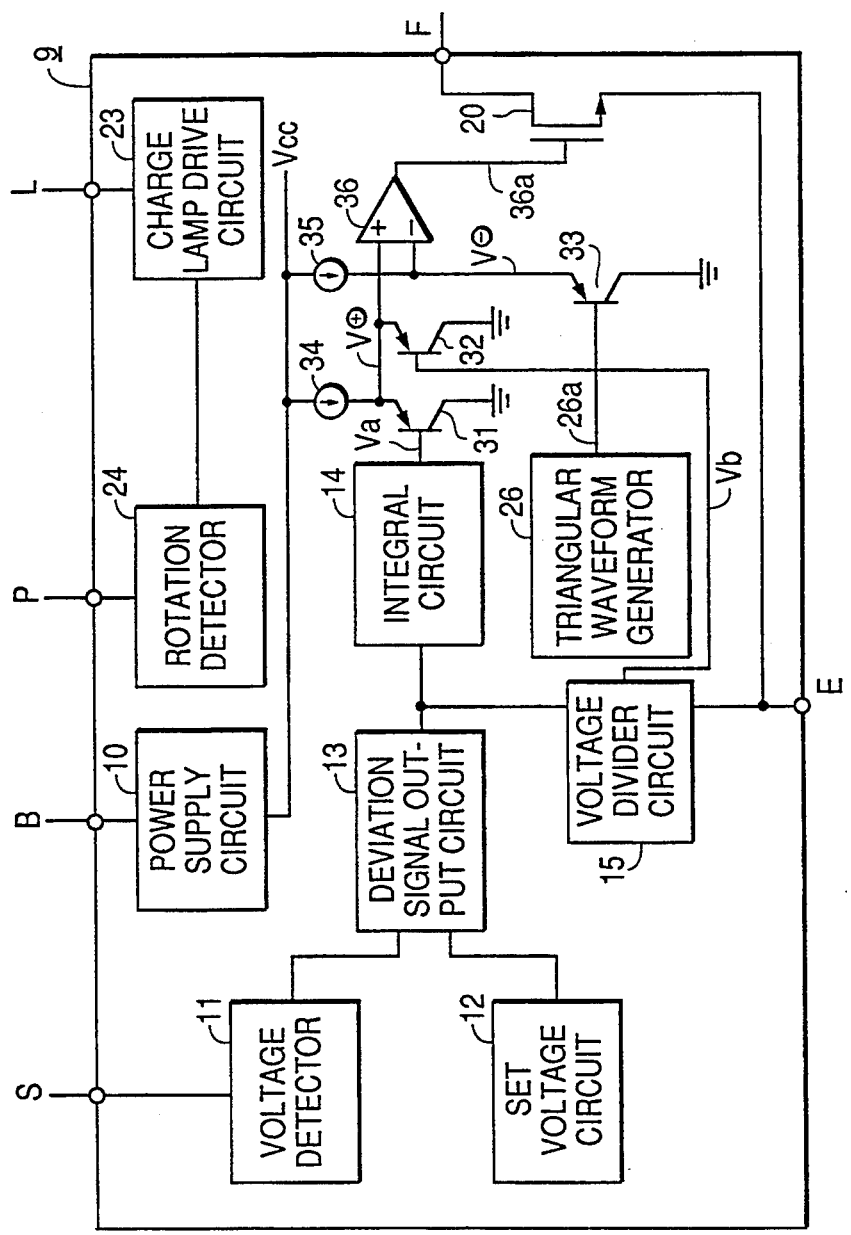
FIG. 11 is a schematic depiction of an alternative embodiment of the regulator circuit of FIG. 1.

FIG. 11 shows another. embodiment of the present invention which realizes a minimum current flow rate passage circuit with a circuit configuration that is somewhat simpler than that of FIGS. 2(a) and 2(b), in that a single comparator is used to drive the MOS FET 20 directly, with the AND gate 19 being eliminated altogether. In addition, in place of the sawtooth signal shown in FIGS. 3(a) and (b), a triangular waveform is employed as the reference voltage in comparator 36. In this embodiment the outputs of the integrating circuit 14 and the voltage divider circuit 15 are connected to the respective .bases of a pair of PNP transistors 31 and 32, whose collectors are grounded and whose emitters are connected to a constant current source 34 and to the plus input of the comparator 36. The output 26a of the triangular waveform generating circuit 26 is input to the base of PNP transistor 33, whose collector is grounded and whose emitter is connected to the constant current source 35 and to the minus output of the comparator 36. The power MOS FET 20 is driven directly by the output of the comparator 36.

Figure 12:
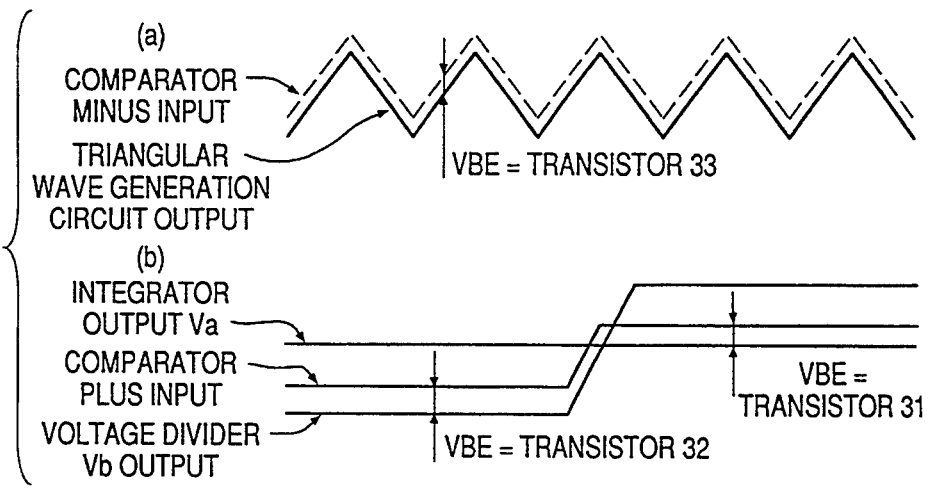
FIG. 12 shows voltage waveforms which illustrate the operation of the embodiment of FIG. 11.

FIGS. 12(a) and 12(b) show the input voltage waveforms applied to the minus and plus inputs, respectively, of the comparator 36. As shown in FIG. 12(b), with the configuration of FIG. 11, the voltage V+ at the positive input to comparator 36 follows the lower of the two voltage $V_a$ and $V_b$, differing only by the base-emitter voltage $V_{BE}$ of transistors 31, 32. Similarly, as shown in FIG. 12(a), the voltage V− at the negative input follows closely the output of triangular waveform generator 26, also differing only by $V_{BE}$ of transistor 33. Comparator 36 thus compares the lower of the two voltages $V_a$ and $V_b$ with the triangular waveform and outputs an off signal as soon as the latter exceeds the former, opening MOS FET 20.

By using a triangular reference waveform rather than the sawtooth waveform of FIGS. 3(a) and 3(b), the duty cycle of the MOS FET 20 is altered in that after the reference voltage reaches its peak, instead of dropping instantaneously, it diminishes gradually. When it falls below the lower of the two voltages $V_a$ and $V_b$, comparator 36 again switches the MOS FET to an OFF state. It is thus apparent that by modifying the shape of the triangular reference waveform, the response characteristics of the circuit can be varied. Of course, it is also apparent that a sawtooth signal could be used with this embodiment as well.

Figure 13:
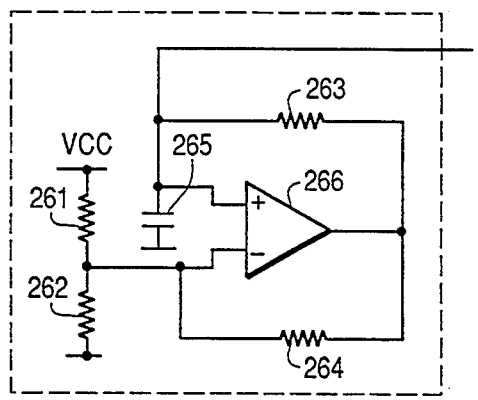
FIG. 13 shows a circuit diagram of a triangular waveform generator suitable for use in FIG. 11.

FIG. 13 is a detailed view of the triangular waveform generating circuit 26 of FIG. 11. When the output voltage of the comparator 266 is at a high level, the condenser 265 is charged through the resistor 263 until the voltage of the condenser 26 becomes VH, at which point it is discharged through the resistor 263 until the voltage of the condenser 26 becomes VL. The reference standard voltages VH and VL are expressed by the following formulae in which the output voltage of the comparator 266 is $V_{cc}$ at the high level condition and 0 V at the low level condition.

$$VL = \frac{R_x}{R_x + R_{261}} \times V_{CC} \quad \text{Equation 3}$$
$$R_x = \frac{R_{263} \times R_{262}}{R_{262} + R_{264}}$$

$$VH = \frac{R_{262}}{R_{262} + R_Y} \times V_{CC} \quad \text{Equation 4}$$
$$RY = \frac{R_{261} \times R_{264}}{R_{261} + R_{264}}$$

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method of controlling charging of a battery comprising the steps of:
    combining an output voltage of said battery with a reference voltage and generating a difference voltage having a magnitude which is indicative of magnitude of a difference between said output voltage and said reference voltage;
    generating a first comparison voltage which is equal to a portion of said difference voltage;
    generating a second comparison voltage which is equal to a time integral of said difference voltage; and
    controlling a rate of charging of said battery as a function of magnitude of a lower of instantaneous values of said first and second comparison voltages.

2. Method according to claim 1, wherein the lower of the instantaneous values of said first and second comparison voltages is used to control a duty cycle of a gating switch which controls charging of said battery.

3. Method according to claim 2, wherein said gating switch controls a flow of current to a generator for charging said battery.

4. Method according to claim 1, wherein said step of using the lower of the instantaneous values of said first and second comparison voltages to control charging of said battery comprises the steps of:
    comparing said first and second comparison voltage respective with a time variable reference voltage; and
    generating a control signal to control charging of said battery when said time variable reference voltage reaches a value which is equal to the lower of said instantaneous values.

5. Method according to claim 4, wherein results of said comparing of said first and second comparison voltages, respectively, with said time variable reference voltage are entered to respective inputs of an AND gate.

6. Method according to claim 5, wherein an output of said AND gate is used to control a gating switch.

7. Method according to claim 4, wherein said time variable reference voltage is a sawtooth waveform.

8. Apparatus for controlling charging of a battery comprising:

a reference voltage source which generates a reference voltage;

a deviation signal output circuit connected to said reference voltage source and to an output of said battery, and having an output signal indicative of a difference between said reference voltage and an output voltage of said battery;

a voltage scaling circuit connected to receive said output signal from said deviation signal output circuit;

an integrator circuit connected to receive said output signal from said deviation signal output circuit;

a variable reference signal generator;

means for generating a control signal when an output from said variable reference signal generator reaches a level which is equal to or greater than a lower of instantaneous values of output signals from said voltage scaling circuit and said integrator circuit;

a battery charging apparatus for charging said battery; and means responsive to said control signal for controlling a duty cycle of said battery charging apparatus.

9. Apparatus according to claim 8 wherein said means for generating a control signal comprises:

a first comparator coupled to receive said output from said voltage scaling circuit and said output from said variable reference signal generator;

a second comparator coupled to receive an output from said integrator circuit and said output from said variable reference signal generator; and an AND gate coupled to receive outputs from said first and second comparators.

10. Apparatus according to claim 8, wherein said variable reference signal generator is a sawtooth signal generator.

11. Apparatus according to claim 9, wherein said variable reference signal generator is a sawtooth signal generator.

12. Apparatus according to claim 9, wherein an output of said AND gate is connected to a gate input of a gating switch which controls a flow of field current to an electric generator, of said battery charging apparatus.

13. Apparatus according to claim 12, wherein said gating switch is a MOS FET.

14. Apparatus according to claim 8, wherein said means for generating a control signal comprises:

a first emitter follower circuit connected to receive an output from said voltage scaling circuit;

a second emitter follower circuit connected to receive an output from said integrator circuit;

a comparator having first and second inputs;

outputs from said first and second emitter follower circuits being connected to the first input of said comparator;

an output from said variable reference signal generator being coupled to the second input of said comparator.

15. Apparatus according to claim 14, wherein said variable reference signal generator is a sawtooth signal generator.

16. Apparatus according to claim 14, wherein an output of said comparator is connected to a gate input of a gating switch which controls a flow of current to an electric generator of said battery charging apparatus.

17. Apparatus according to claim 16, wherein said gating switch is a MOS FET.

18. Method of controlling charging of a battery, comprising the steps of:

generating a deviation signal having a magnitude which is indicative of magnitude of a difference between an output voltage of said battery and a reference voltage;

scaling said deviation signal in a voltage scaling circuit;

integrating said deviation signal;

comparing instantaneous values of results of said scaling step and said integrating step; and controlling a duty cycle of field current in a battery charging apparatus as a function of magnitude of a lower of said instantaneous values.

19. Method according to claim 18, wherein said lower of said instantaneous values controls operation of a gating switch through which said field current flows.

20. Method according to claim 19, wherein said gating switch is a MOS FET.

21. A charging controller for vehicles comprising:

a field coil for generation a rotating magnetic field, said field coil being driven in accordance with rotation of an engine;

an armature having an armature coil for generating a current in response to said rotating magnetic field, and for charging a battery through a rectifier;

a voltage detection circuit for detecting one of voltage of said battery and voltage of said rectifier;

a set voltage circuit for generating a reference voltage;

a differential signal output circuit for outputting a signal indicative of a difference between an output voltage of said voltage detection circuit and said reference voltage;

a waveform generator for generating a voltage waveform which rises and falls at a preset cycle within a fixed voltage range;

an integrating circuit coupled to an output voltage of said differential signal output circuit, said integrating circuit having a time constant longer than a time constant of a rotor of said armature;

a voltage divider circuit for dividing an output voltage of said differential signal output circuit;

a comparator coupled to receive at one output thereof a voltage equal to a constant plus a lower of an output voltage of said integrating circuit and an output voltage of said voltage divider circuit, and to receive at another input thereof an output of said waveform generator; and a current control circuit for controlling current supplied to said field coil in response to an output of said comparator.

22. A charging controller for vehicles comprising:

a field coil for generation a rotating magnetic field, said field coil being driven in accordance with rotation of an engine;

an armature having an armature coil for generating a current in response to said rotating magnetic field, and for charging a battery through a rectifier;

a voltage detection circuit for detecting one of voltage of said battery and voltage of said rectifier;

a set voltage circuit for generating a reference voltage;

a differential signal output circuit for outputting a signal indicative of a difference between an output voltage of said voltage detection circuit and said reference voltage;

a sawtooth signal generator circuit for outputting a sawtooth signal at preset cycles within a fixed voltage range;

an integrating circuit coupled to receive an output voltage of said differential signal output circuit, said integrating circuit having a time constant longer than a time constant of a rotor of said armature;

a voltage divider circuit for dividing an output voltage of said differential signal output circuit;

a first comparator coupled to receive an output voltage of said integrating circuit and said sawtooth signal;

a second comparator coupled to receive an output voltage of said voltage divider circuit and said sawtooth signal;

a minimum current flow rate passage circuit for outputting a reduced current flow rate in response to comparing the output of said first comparator with the output of said second comparator; and a current control circuit for controlling the current to be supplied to said field coil in response to the output of said minimum current flow rate passage circuit.

23. A charging controller for vehicles according to claim 21, wherein the charging controller further comprises means for fixing the output voltage of said integrating circuit with a higher value than a maximum value of the output voltage of said waveform generator circuit when engine speed exceeds a preset value.

24. A charging controller for vehicles according to claim 22, wherein the charging controller further comprises means for fixing the output voltage of said integrating circuit at a value which is higher than a maximum value of said sawtooth signal when engine speed exceeds a preset value.

25. A charging controller for vehicles according to claim 23, wherein said means for fixing is arranged between a power supply circuit and an output of said integrating circuit, and said fixing means comprises a switch controlled in response to an output of a rotation detection circuit.

26. A charging controller for vehicles according to claim 24, wherein said means for fixing is arranged between a power supply circuit and an output of said integrating circuit, and said means comprises a switch controlled in response to an output of a rotation detection circuit.

* * * * *